July 8, 1924.

1,500,324

B. JOHNSON

COMBINED TRACTOR AND COTTON PICKING MACHINE

Filed April 5, 1920 7 Sheets-Sheet 1

Fig. 1.

Witness

Inventor
B. Johnson,
By C. A. Snow & Co.
Attorneys

July 8, 1924.  1,500,324
B. JOHNSON
COMBINED TRACTOR AND COTTON PICKING MACHINE
Filed April 5, 1920   7 Sheets-Sheet 7

B. Johnson, Inventor

Patented July 8, 1924.

1,500,324

UNITED STATES PATENT OFFICE.

BILLIE JOHNSON, OF TEMPLE, TEXAS.

COMBINED TRACTOR AND COTTON-PICKING MACHINE.

Application filed April 5, 1920. Serial No. 371,351.

*To all whom it may concern:*

Be it known that I, BILLIE JOHNSON, a citizen of the United States, residing at Temple, in the county of Bell and State of Texas, have invented a new and useful Combined Tractor and Cotton-Picking Machine, of which the following is a specification.

This invention relates to a machine for picking or harvesting cotton from the plants growing in the field, one of its objects being to provide a cotton picking and collecting mechanism which can be bodily applied to or removed from a tractor of novel construction and which tractor, when not used in connection with the cotton picking mechanism, can be employed for various other purposes, such as drawing plows, cultivators and the like.

A further object of the invention is to provide cotton picking mechanism which is compact in construction, can be adjusted readily to cotton plants of different heights, and which is provided with simple but efficient mechanism for forcing the picking elements into and out of the plants straddled by the machine.

Another object is to provide picking needles of novel form which will engage the fibres of the cotton and pull them from the bolls, there being means carried by the machine for maintaining the plants in upstanding position during the picking action so that they will not be pulled over onto the ground by the machine passing along the row.

Another object is to provide simple and efficient means for collecting the cotton after it has been removed from the picking needles and for directing it into a suitable container provided therefor.

Another object is to provide picking needles so constructed that they will not engage the leaves or twigs or burs but are only capable of engaging the fibres of the cotton so as to pull them from the bolls.

Another object is to provide a tractor of the crawler or caterpillar type for use in connection with the cotton picking mechanism and which tractor constitutes means for protecting the cotton picking mechanism when the machine is traveling over rough or uneven ground.

Another object is to provide novel means for maintaining the endless treads or belts of the tractor taut although capable of yielding when necessary to prevent breakage of the parts.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Referring to the figures by characters of reference 1 designates a frame of a tractor having skeleton sides 2 depending therefrom. Hangers 3 extend outwardly and thence downwardly from the top of the frame 1 at the sides thereof and are connected at their lower ends by longitudinal bars 4 the ends of which are preferably inturned and secured to the ends of the skeleton sides 2, as shown at 5.

Secured to the sides 2 and to the bars 4 are short shafts 6, those shafts 6 located nearest to the front of the machine being mounted in slidable boxes 7 mounted in slots 8 provided therefor in the bars 4 and adapted to be adjusted longitudinally by means of bolts 9.

Figures 9, 11:
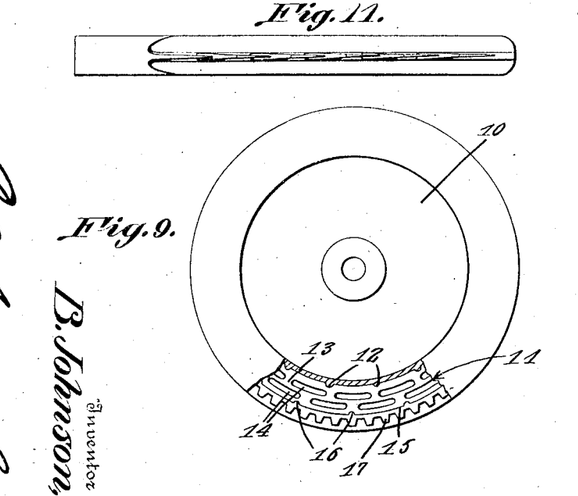
Figure 9 is a view partly in side elevation and partly in section of one of the supporting wheels of the tractor.
Figure 11 is a plan view thereof.

Journaled on each of the shafts 6 is a wheel 10 having a deep peripheral channel 11, the bottom wall of the channel being formed with spaced transverse ribs 12, as shown particularly in Figure 9. Seated in the channel 11 and engaging the ribs 12 so as to be held against rotation relative to the wheel 10 is a cushion 13 preferably formed of rubber and having cells 14 therein. This cushion is interposed between the inner wall of the channel 11 and the inner wall of a ring gear 15 on which are formed transverse ribs 16 which engage the cushion. Thus it will be seen that each of the ring gears 15 will rotate with its wheel 10 although capable of shifting radially because of the cushioning action of the part 13. Relative rotation of the parts is prevented, however, by the transverse ribs 12 and 16.

The two rear wheels 10 have gears 17 attached to the inner sides thereof and meshing with gears 18 secured to a transverse shaft 19. The shaft 19 is adapted to be operated through suitable mechanism not shown by the shaft 20 of the engine indicated generally at 21 and which is mounted on the front portion of the frame 1. It is preferred to include a differential in the drive connection between the shaft 20 and the shaft 19 so that the two rear wheels can be rotated at different speeds.

Mounted on the wheels 10 at each side of the tractor are endless chains 22 which engage the gears 15 so as to be driven by the wheels. To these chains are attached tread blocks 23 adapted to bear upon the ground and thus support the tractor while traveling over rough or uneven surfaces. The endless belts thus formed can be drawn taut by means of the adjusting screws 9, which, when rotated in one direction, will pull upon the blocks 7. In view of the yielding mounting of the gears 15, however, it is possible for the endless tread belts to flex when passing over unyielding obstructions. The cushions 13 in the wheels also act to absorb shocks, thereby to render the machine less likely to be damaged by vibrations produced when traveling over a rough surface.

The tractor may be provided with a seat 24 for use by the driver and a fuel tank can be located under the seat, as shown at 25.

Figure 5:
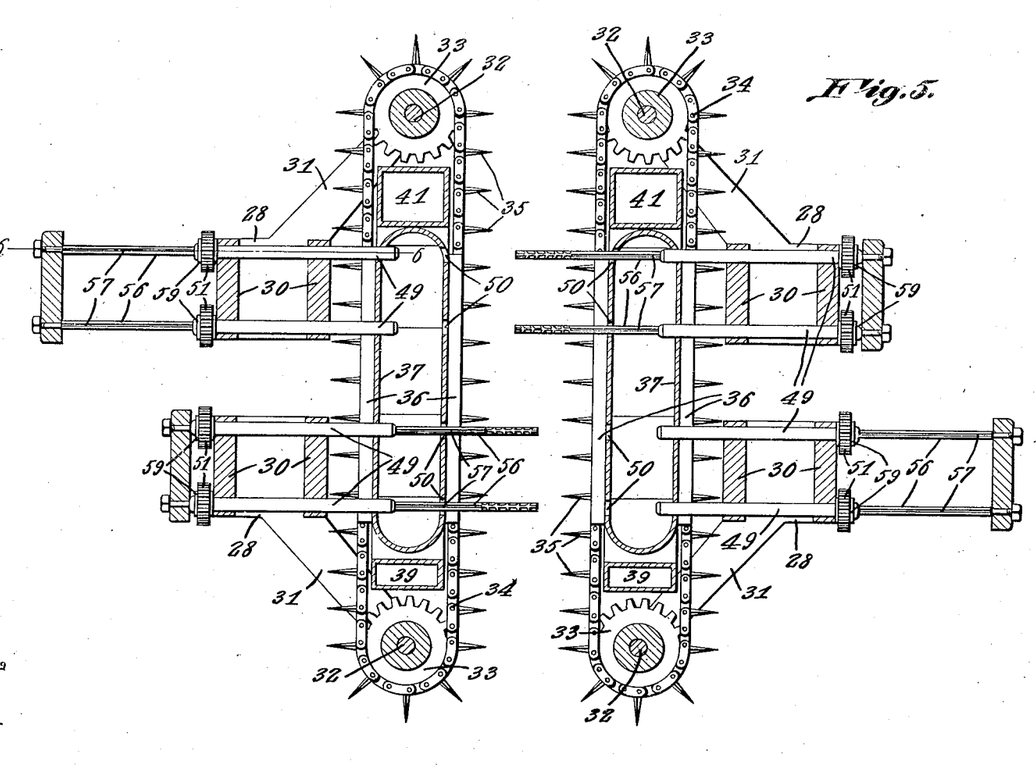
Figure 5 is a horizontal section through the picking mechanism, said section being on the line 5—5, Figure 4.

The tractor thus far described can be used as such for various purposes, it being seen that a large space is left below the frame 1 and between the wheels 10. This space is adapted to receive the picking mechanism of the cotton harvester forming a part of the present invention. This picking mechanism includes oppositely disposed picking units each made up of an upper bracket 26 adapted to be detachably secured, as at 27, to a portion of the side skeleton frame 2 of the tractor and lower brackets 28 adapted to be detachably secured, as at 29, to the lower portion of the side skeleton frame. The upper and lower brackets are connected by parallel bars 30 preferably arranged in pairs, as shown in Figure 5. Arms 31 are extended from the brackets 26 and 28 and provide bearings for front and rear vertical shafts 32 carrying spaced superposed sprockets 33 engaged by endless chains 34 or the like. Fingers 35 are extended substantially horizontally from these endless chains. These chains 34 are adapted to travel in channeled guide rails 36 which are spaced apart and are connected to cotton receiving compartments 37 formed between the flights of each chain and extending downwardly through the spaces surrounded by all of the chains, the lower portions of these compartments 37 providing troughs 38. Opening into each trough at one end thereof is a downwardly extending flue 39 connected to a fan casing 40 and adapted to receive air exhausted from said casing. The other end of each of the troughs 38 has a flue 41 extending upwardly therefrom and merging into an arcuate a portion of the convex wall of which is formed of a screen as shown at 43 in Figure 1. A hood 44 extends over this screen and is connected by a flue 45 to the air intake of the fan casing 40. Thus it will be seen that when the fan in the casing is in operation a suction will be set up which will operate to lift cotton from the troughs and through the flues 41 and to draw the cotton against the screen 43 along which it will gravitate into the lower end of the flue 42 at a point indicated at 46. Here the cotton will be met by a portion of the air exhausted from the fan and will be blown through a pipe 47 into a foraminous receiver 48 mounted on the rear portion of the tractor. A portion of the air exhausting from the fan casing will travel downwardly through the flue 39 and into one end of each trough so as to blow the collected cotton longitudinally along the trough and up to the opposite end of the trough where it will be conveyed upwardly into the flue 41 by suction as before explained. Thus it will be seen that the cotton will be carried off as rapidly as deposited in the collecting chambers 37 and their bottom troughs 38.

Figure 1:
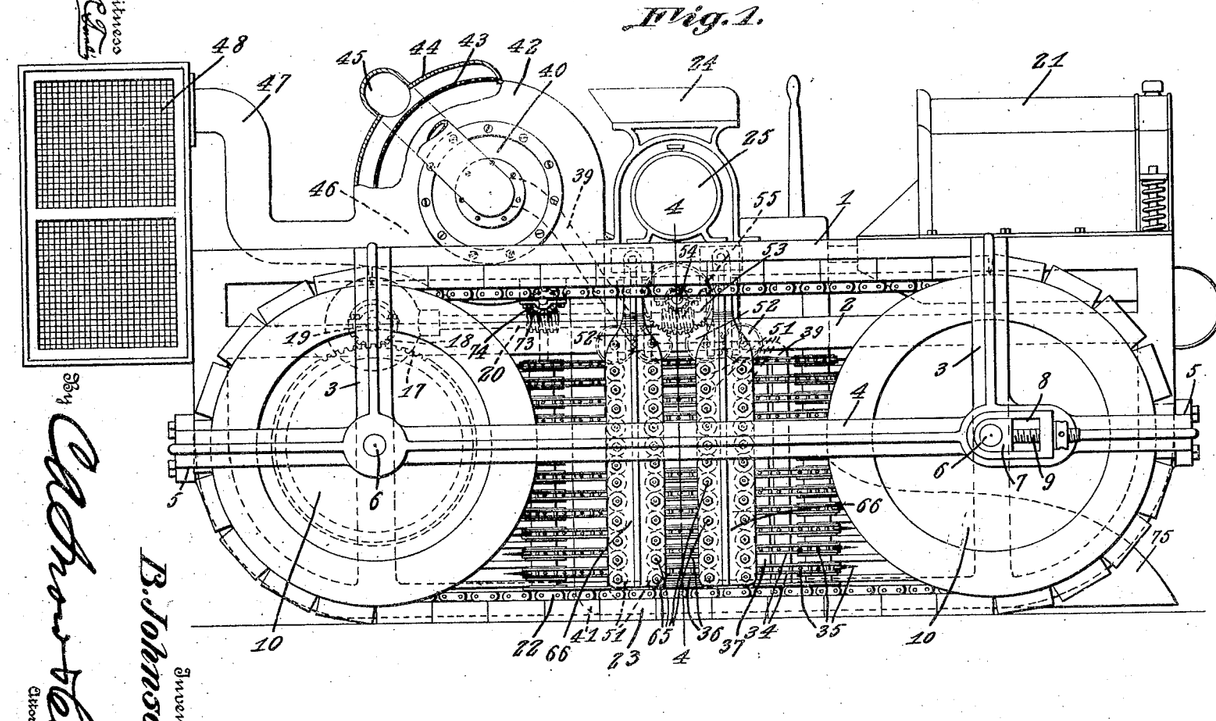
Figure 1 is a side elevation of the tractor with the picking mechanism combined therewith, a portion of the cotton conveying mechanism being shown in section.
Figure 4:
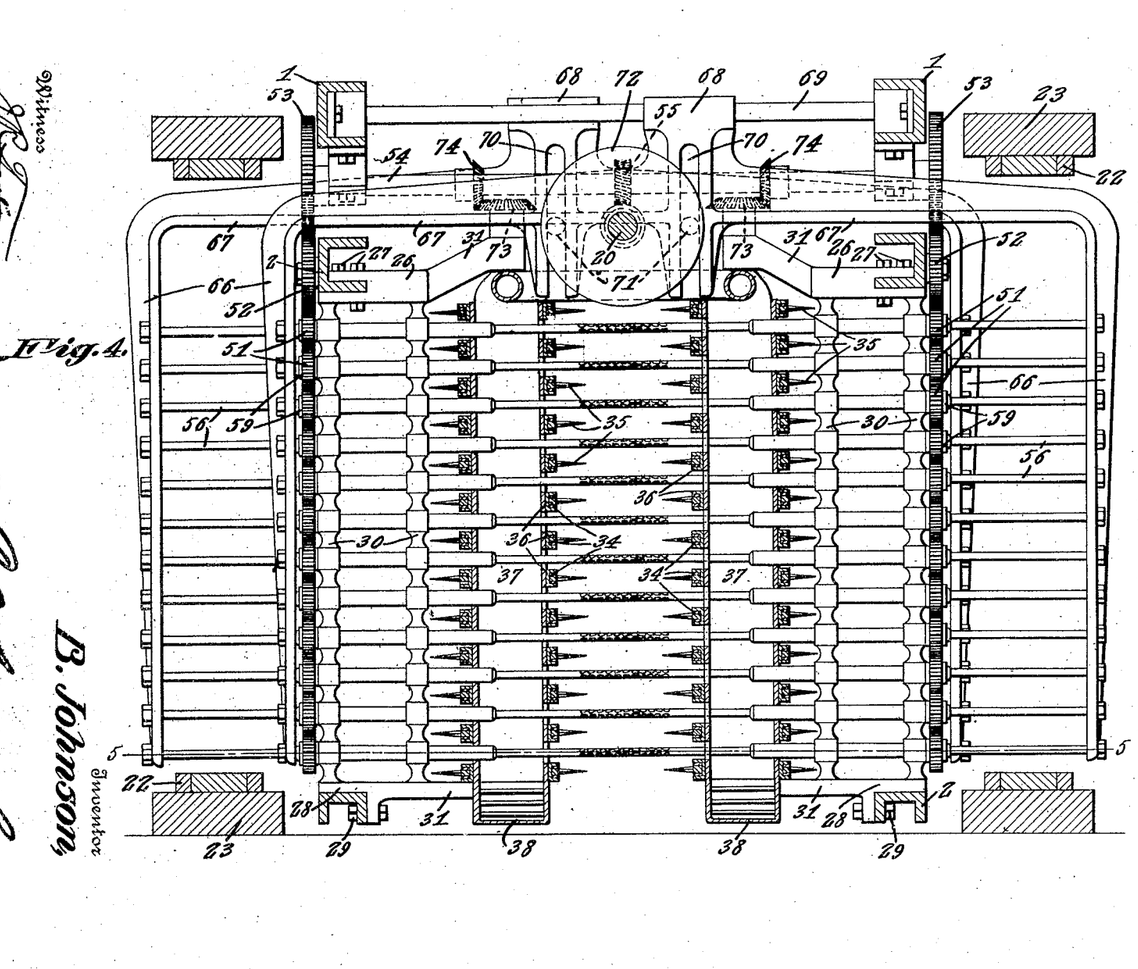
Figure 4 is an enlarged vertical transverse section through the picking mechanism, said section being taken on the line 4—4, Figure 1.

Mounted for rotation in the bars 30 are sleeves 49 which project into the outer side walls of the chambers 37 and are supported in line with openings 50 formed in the inner side walls of said chambers at points between the guide rails 36. The sleeves 49 of each unit are supported in line with the sleeves 49 of the opposed unit as will be apparent by referring to Figures 4 and 5. Each of the sleeves 49 has a gear 51 secured to the outer end thereof so as to rotate therewith and the gear 51 of each sleeve constantly meshes with the next adjoining gear in vertical alignment therewith so that, where four vertical rows of sleeves 49 are provided in each picking unit, as shown in Figure 5, for example, there will be four vertical trains of gears extending from the bottom to the top of the picking unit, the upper gears of each train meshing with large intermediate gears 52 as shown in Figure 1 and which intermediate gears are arranged in pairs, the gears of each pair meshing with each other. One gear 52 of each pair meshes with a large drive gear 53 and this drive gear in turn is secured to a transverse shaft 54 receiving motion through worm gearing 55 from the shaft 20 of the engine. Thus it will be seen that during the actuation of said shaft all of the sleeves 49 of each picking unit will be rotated simultaneously and as the transverse shaft 54 serves to drive both units through mechanism at each side of the machine, it will be apparent that all of the sleeves of the two picking units will thus be driven simultaneously.

Figures 6, 10:
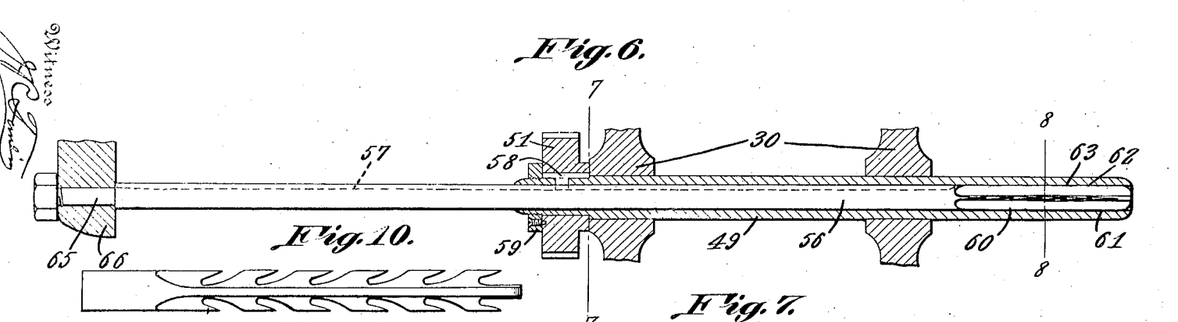
Figure 6 is an enlarged longitudinal section through one of the picking needles and adjacent parts.
Figure 10 is an elevation of a portion of one of the needles.
Figures 7, 8, 12:
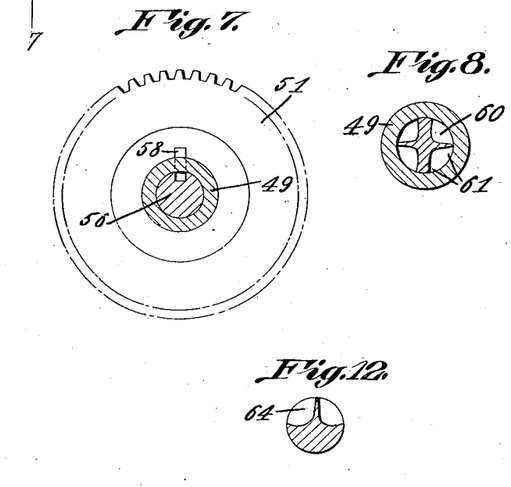
Figure 7 is a section on line 7—7, Figure 6.
Figure 8 is a section on line 8—8, Figure 6.
Figure 12 is a transverse section through a modified form of picking needle.

Slidably mounted within each of the sleeves 49 is a picking needle 56 having a longitudinal groove or keyway 57 into which projects a key 58 extending from the sleeve 49. As shown in Figure 6 this key 58 is preferably utilized also for fastening the gear 51 to the sleeve 49, the gear and key being held in place by a nut 59 threaded on one end of the sleeve as shown. The inner or active end of each needle 56 is rounded and preferably formed with longitudinal grooves 60 providing ribs 61 therebetween. These ribs are formed with recesses 62 so that teeth 63 are thus provided in longitudinal series, all of the teeth being extended in the direction of the inner end of the needle and having their outer ends pointed and in line with the outer longitudinal edges of the teeth and the periphery of the needle 56. Each tooth has its sides converging toward the point. While four of these longitudinal series of teeth are preferably used, it is to be understood that the number may be varied and in Figure 12 has been shown a single longitudinal series of teeth indicated at 64.

The outer end of each needle 56 has a reduced end 65 secured within a bar 66 constituting one arm of a yoke 67. In the machine illustrated two of these yokes have been provided, the forward sets of needles of both units being connected to opposite portions of one yoke while the rear sets of needles of both units are connected to the arms of the other yoke. Each yoke has a head 68 projecting upwardly therefrom and the said heads are mounted to slide upon transverse guide rods 69 connected to the top of the tractor frame 1. Vertical slots 70 are formed in the respective yokes and working within these slots are wrist pins 71 extending from disks 72 which are secured to the shaft 20. The wrist pins are located at diametrically opposed points on the disk and thus it will be seen that when the disks are rotated the yokes 67 will be reciprocated transversely, each yoke moving in a direction opposite to the other yoke.

Each of the shafts 32 has a gear 73 at its upper end and these gears mesh with gears 74 attached to the transverse shaft 54 hereinbefore referred to.

Figures 13, 14:
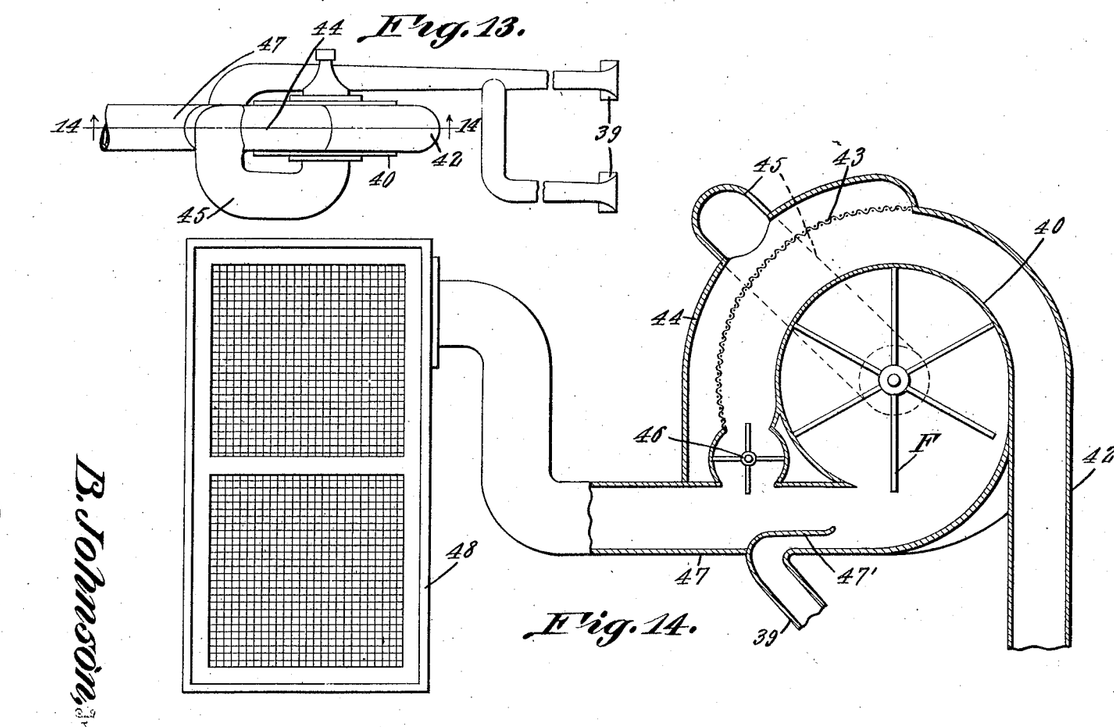
Fig. 13 is a plan view of the blast portion of the pneumatic system.
Fig. 14 is a section through the suction and blast flues on the blower casing.

As has heretofore been pointed out the tractor herein described can be used independently of the cotton picking mechanism. When, however, it is desired to utilize the picking mechanism, said mechanism is inserted downwardly into the frame of the tractor so that the slots 70 will be brought into engagement with the wrist pins 71 and the brackets 26 and 31 can be brought into engagement with the upper and lower portions of the skeleton sides of the tractor and fastened thereto. The parts are thus readily connected to the mechanism of the tractor, the worm gearing 55 and the gears 74 and 73 being brought into mesh readily by thus placing the cotton picking mechanism in position. When the said mechanism is thus located and the machine is driven forward motion is transmitted through the shaft 54 from the engine shaft 20 to the endless chains 34 and to the trains of gears 51 so that the sleeves 49 are all rotated as hereinbefore explained. The rotating disks 72 will reciprocate the yokes 67 and as these yokes are connected up to the needles 56 it will be apparent that the needles will likewise be reciprocated and at the same time be rotated with the sleeves 49. The chains 34 will move in a direction to overcome the drag of the machine upon the plants being acted upon. In other words the innermost flights of the chains will travel rearwardly at approximately the same speed as the machine is traveling forwardly. Thus the plants engaged by the fingers 35 will be maintained in upstanding position while the needles which are reciprocated transversely in the manner hereinbefore pointed out will be thrust into and out of the plants. As these needles are constantly rotating during their reciprocation the teeth on the needles will engage the fibres and twist them about the needles, thus withdrawing the fibres from the bolls. As the needles move longitudinally toward their respective sleeves 49 the cotton fibre adhering to the teeth on the needles will be drawn through openings 50 (Fig. 5). It will then be stripped from the needles and will fall downwardly within the receiving chambers 37 so as to be received by the troughs 38. When the cotton is deposited in either of the troughs it is blown toward one end of the trough by an air blast delivered from the flue 39 connected to said trough, and is also drawn toward said end by suction set up through the flue 41 connected to the trough. When the fan in casing 40 is in operation air is drawn through the flues 41 upwardly to the arcuate flue 42 (Fig. 1) and thence through the screen 43 to hood 44 and flue 45. Flue 45 opens into casing 40. Cotton drawn up by suction within each flue 41 will be stopped by screen 43 and thus separated from the air current. This cotton will be engaged by a rotary vacuum feeder 46 located in the flue 42 below the screen 43 and which will deliver the cotton into flue 47. Air drawn into the casing 40 from flue 45 will be expelled into the flue 47 by the fan F, the expelled air current being split at 47' so that a portion of the expelled air will flow into the flue 39 while the remainder of the expelled air will flow along the flue 47 and blow into the receiver 48 all of the cotton that has been delivered into the flue 47 from the feeder 46. See Fig. 14.

Figure 2:
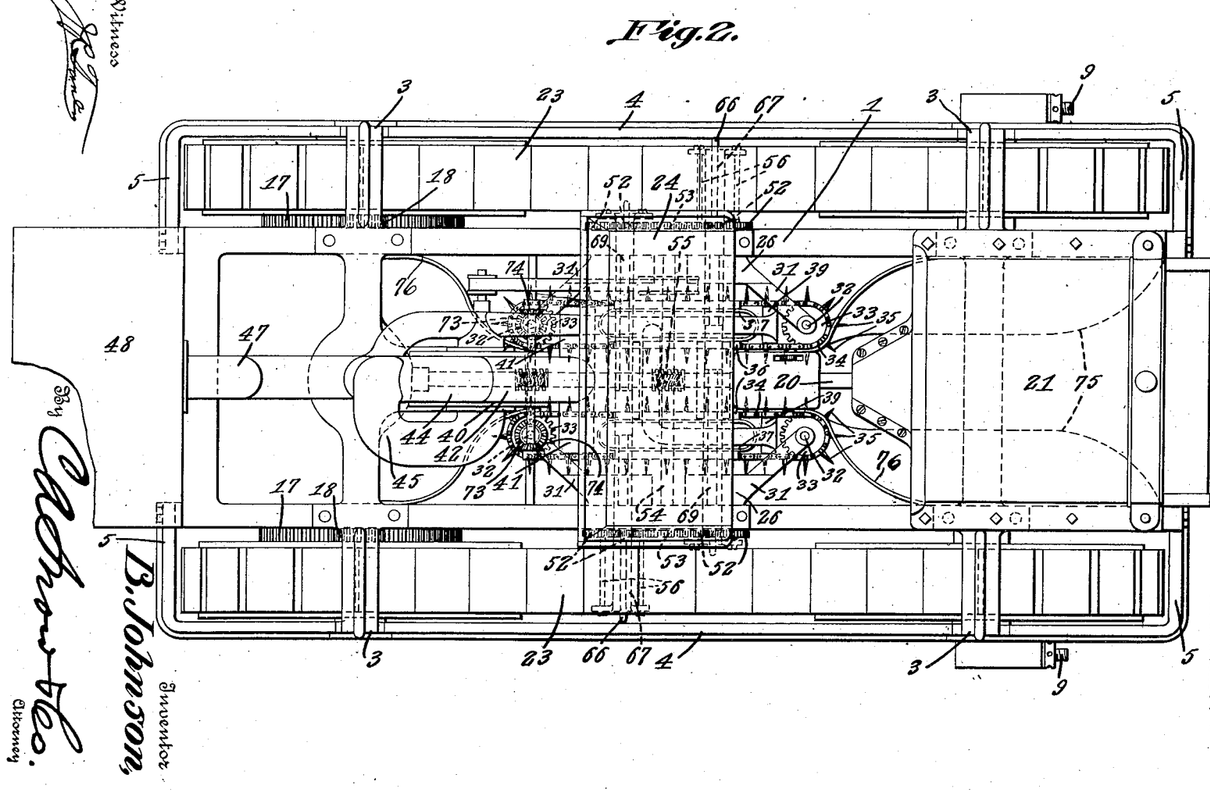
Figure 2 is a plan view of the machine.
Figure 3:
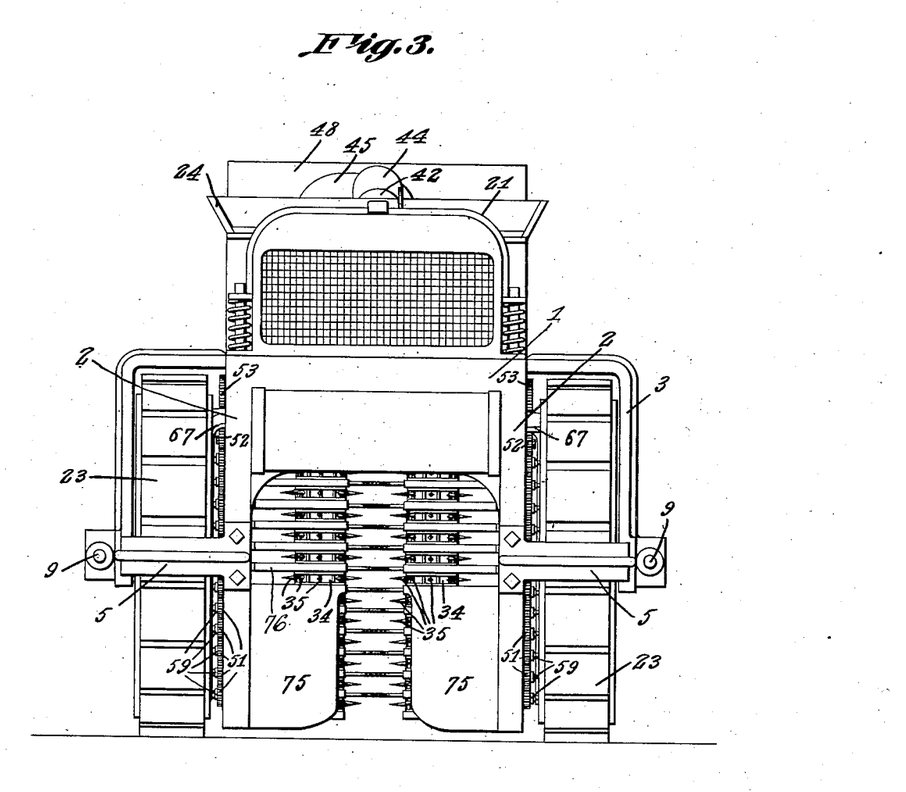
Figure 3 is a front elevation.

For the purpose of facilitating the picking action, it is preferred to mount within the front portion of the machine between the depending skeleton sides, opposed curved lifting plates 75 which will gather the side branches of the plants and properly guide them into the space between the picking units. It is also preferred to extend superposed guide strips 76 from the inner sides of the tractor frame and to the spaces between the superposed chains 34. These strips are curved, as shown particularly in Figure 2 and serve to positively deflect the plants into the space between the two series of chains 34.

What is claimed is:

1. The combination with a movably supported tractor frame, of picking mechanism insertible downwardly into the frame, supporting means carried by the picking mechanism and detachably secured to opposed portions of the frame, yokes movably mounted and constituting portions of the picking mechanism, rotatable driving elements carried by the tractor frame, and means carried by the yokes for detachably engaging said elements for actuation thereby.

2. In a cotton picking machine a collecting chamber having a perforated inner side wall, superposed holding chains movable around said chamber, outstanding plant engaging devices thereon, and a group of superposed picking needles mounted for rotation between said superposed chains and for reciprocation transversely of the collecting chamber and within the perforations in the inner side wall.

3. In cotton picking apparatus the combination with a collecting chamber having an apertured inner side wall and pneumatic means for withdrawing cotton therefrom, of needles mounted for rotation within the chamber, and means for reciprocating said needles transversely of the chamber and within the apertures during their rotation.

4. In cotton picking mechanism the combination with a cotton receiving chamber having an apertured inner side wall and pneumatic means for withdrawing cotton from the chamber, of needles mounted to rotate and reciprocate transversely of the chamber and within the apertures in the inner side wall, and means for doffing cotton fibres from the needles and within the chamber.

5. In cotton picking mechanism the combination with a substantially closed cotton receiving chamber having an apertured inner side wall and pneumatic means withdrawing cotton from said chamber, of doffing sleeves mounted for rotation and projecting into the chamber, needles revoluble with the sleeves and projecting through said chamber, and means for reciprocating the needles to project them laterally through the apertured wall and beyond the chamber and to retract them into the chamber and sleeves to doff fibres adhering to the needles.

6. In a cotton picking machine the combination with a substantially closed cotton receiving chamber having an apertured inner side wall and means for removing cotton from said chamber, of sleeves mounted for rotation and projecting into the chamber, needles mounted for rotation with the sleeves and movable through and laterally beyond the chamber, teeth upon each needle and having their terminals in line with the periphery of the needle, and means for reciprocating said needles during their rotation with the sleeves to engage cotton fibres, to draw them through the apertures in the inner side walls and into the chamber and against the sleeves to strip the fibres from the needles and deposit them in the chamber.

7. In a cotton picking machine the combination with a substantially closed receiving chamber having an apertured inner side wall and opposed guide rails connected to the walls of said chamber and disposed in superposed relation, of endless flexible devices mounted for movement along said rails, plant engaging devices outstanding therefrom, and needles mounted for rotation and reciprocation transversely of said chamber, within the apertures in the wall and between the superposed rails.

8. In a cotton picking machine the combination with a depending yoke and means for reciprocating the yoke, of sleeves mounted for rotation between the sides of the yoke and arranged in opposed series, the corresponding sleeves of the two series being in alignment, needles mounted for rotation with the sleeves and connected to and adapted to reciprocate with the sides of the yoke, and means for rotating the sleeves.

9. In a cotton picking machine the combination with a supporting rod and a yoke depending therefrom and adapted to reciprocate thereon, of opposed groups of sleeves mounted for rotation, the corresponding sleeves of the two groups being disposed in alignment but spaced apart, needles mounted for rotation with the sleeves and connected to the sides of the yoke to reciprocate with the yoke, and means for reciprocating the yoke, said means including a slotted head, and a revoluble element engaging said slotted head.

10. In a cotton picking machine the combination with a cotton receiving trough and superposed picking and doffing means thereabove, of means for directing a current of air longitudinally of the trough from one end, and means for removing cotton by suction from the other end of the trough.

11. In a cotton picking machine a substantially closed collecting chamber having an apertured inner side wall, revoluble picking needles mounted for reciprocation within the apertures in the side wall for drawing cotton fibers into the chamber, means within the chamber and cooperating with the needles for doffing the cotton from the needles, means for directing an air blast into the chamber at one end and along the bottom thereof toward the other end, and a cotton suction flue for receiving cotton forced by the air blast along the bottom of the chamber.

12. In a cotton picking machine a substantially closed collecting chamber having an apertured inner side wall, revoluble picking needles mounted for reciprocation within said apertures for drawing picked fibers into the chamber, means for stripping the fibers from the needles and depositing them within the chamber, a fan, a suction flue extending to the fan from one end of the bottom of the chamber and constituting a cotton outlet, a blast flue extending from the fan to the other end of the chamber at the bottom thereof, and means interposed between the suction flue and the fan for separating air from the cotton withdrawn from the chamber.

In testimony that I claim the foregoing as my own, I have hereto affixed my signature in the presence of two witnesses.

BILLIE JOHNSON.

Witnesses:
A. A. WEBB,
J. R. MOORE.